United States Patent [19]
Hermo

[11] Patent Number: 5,468,001
[45] Date of Patent: Nov. 21, 1995

[54] SWITCHING AND CONTROL SYSTEM WITH FOUR VIDEO GAME BOARDS

[75] Inventor: Eduardo M. Hermo, Parla, Spain

[73] Assignee: Sega, S.A., Madrid, Spain

[21] Appl. No.: 820,360

[22] Filed: Jan. 14, 1992

[30] Foreign Application Priority Data

Aug. 1, 1991 [ES] Spain .................................... 9101809

[51] Int. Cl.⁶ ....................................................... A63F 9/22
[52] U.S. Cl. ............................................................... 273/434
[58] Field of Search ................................ 273/434, 148 B

[56] References Cited

U.S. PATENT DOCUMENTS 4,516,777  5/1985  Nikora ................................. 273/148 B
4,922,420  5/1990  Nakagawa et al. .................. 273/148 B
5,114,157  5/1992  Kita ..................................... 273/148 B

*Primary Examiner*—Vincent Millin
*Attorney, Agent, or Firm*—Helfgott & Karas

[57] ABSTRACT

A switching and control system for controlling video game boards of video game machines comprises a CPU, input/output circuits and a system RGB generator. The control functions are governed by the CPU which has a microprocessor and a circuitry for the program hardware. The switching function is performed through the input/output circuits and switches, as instructed by the CPU by connecting the power supplied by a power source to provide an audio signal for loudspeakers and a color signal (RGB) and a synchronism signal for each of the selected video game boards.

3 Claims, 1 Drawing Sheet

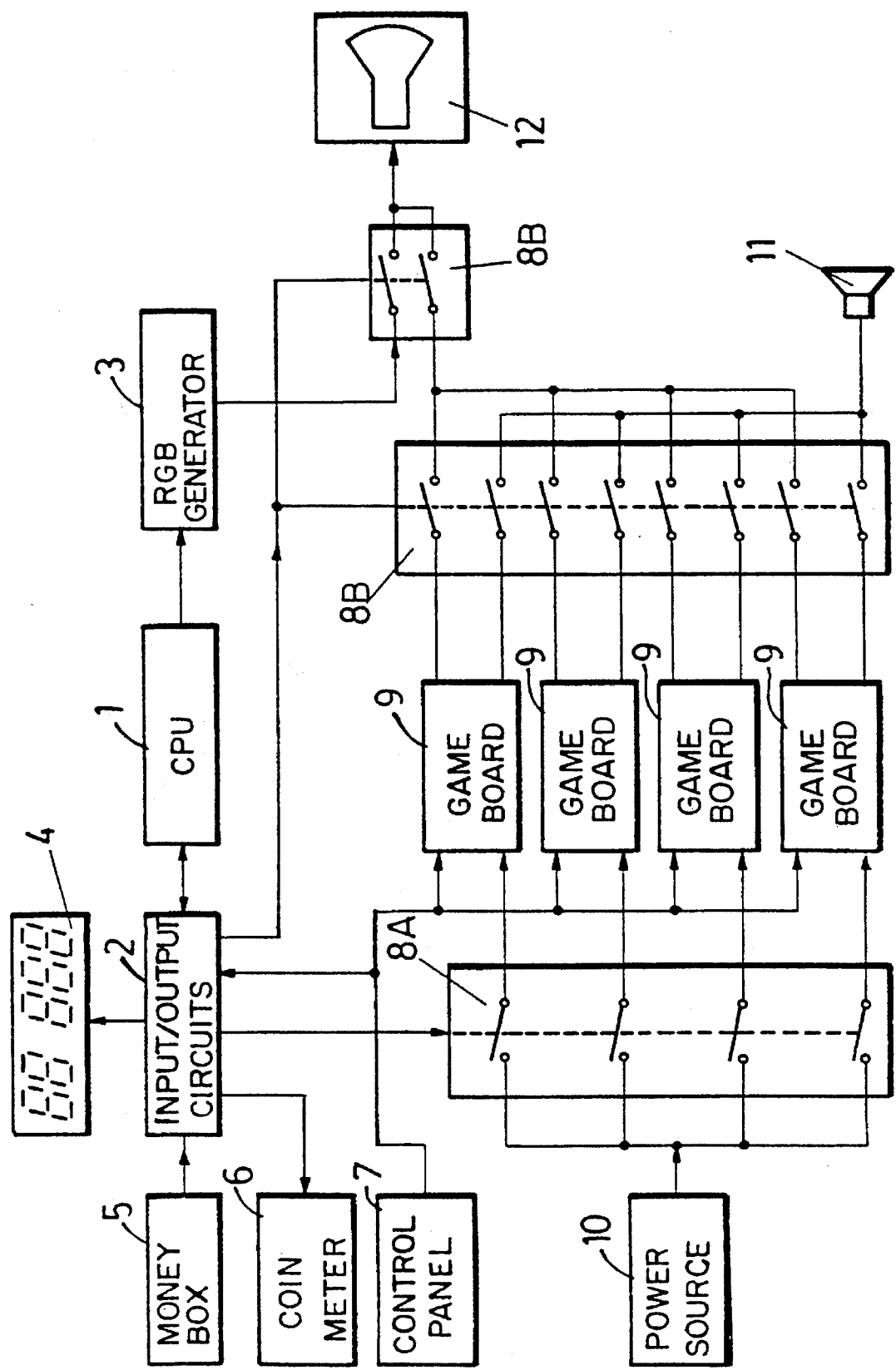

SWITCHING AND CONTROL SYSTEM WITH FOUR VIDEO GAME BOARDS

OBJECT FIELD OF THE INVENTION

The present invention relates to a switching and control system with four video game bards especially designed for video game machines. Thus, the player will in a single machine be able to select the game he wishes to play thereby rendering the same more appealing and providing a wider range of choices to the player, and enabling the owner of the machine to make a greater profit.

BACKGROUND TO THE INVENTION

Nowadays, the technique used in this market sector is varied but in all cases is somewhat inconvenient.

In the conventional system using a single beard and a power source, when the game declines the board must be replaced for it will no longer be appealing and takings will hence drop, which therefore renders the system costly.

In a system where the diskettes are replaced, with a base board and power source the disadvantages are similar to the above, saving that the replacement cost is not so high, for it suffices to replace the diskette and certain hardware memory, the disadvantage being having to rely exclusively on the firm designing the game board, as regards both prices and time interval in the introduction:n of new games in the market, and on the new games being accepted by the user.

A system using character boards or cartridges, in addition to having the same disadvantages as above, is further inconvenient in that the games are based upon others that are fairly reputable and the image and sound quality is not up the standards of the originals. The only favourable circumstance of this system lies in the possibility of the user choosing the game he wishes to play.

Finally, a system using individual boards, with a control board and power source(s) has the added problems of increased cost, consumption and space, for a power source other than that fitted with the base board must be provided, in direct proportion to the aggregate consumption of all the game boards. This moreover generates a heat level that is difficult to dissipate, for the aggregate heat produced by the monitor, boards and sources, inter alia, is very high since they all work together.

Another disadvantage is that in some systems all the boards play by credits and in others by counting (time).

Nor does the player have sufficient information to select at all times the game that he wishes to play; just as little information is available to the owner on these systems, with a view to obtaining such machine's game statistics.

In the event of breakdown, the owner must promptly replace the faulty board by one in working order for if the system were to be without a board the user would be unable to detect the absence of a game and could therefore select such game to end up with nothing, thus losing the price of the game.

DESCRIPTION OF THE INVENTION

The switching and control system with four video game boards solves the problems characteristic of the above systems.

Such system essentially comprises a C.P.U., input/output circuits and a system RGB generator.

The input/output circuits are responsible for communicating the C.P.U. with the outside, in either direction. The C.P.U. may, through this circuitry, view the number of credits or time in displays and may contemporaneously know the user's instructions through a money box or control panel buttons.

This group of input/output circuits includes the part of the system which switches the various boards, its function being to switch power supply, audio signal for the loudspeakers and to switch the colour (RGB) and synchronism signal, choosing which of these elements of the four boards to switch to depending upon the set program and the user's orders received from the outside.

The system RGB generator encompasses the circuitry as a whole which sequentially views on the monitor screen all the information the C.P.U. sends as different moves are made, all under program control.

The said system eliminates the possibility of the system declining or at any rate makes this happen in the longer run for the machines has four games and thus board wear is more sporadic, precisely due to the diversity of games. No one specific manufacturer need be relied upon and any board, even if obsolete, can be installed.

As the boards are original there is no inconveniently low quality of image and sound, and the quality depends solely upon the manufacturer's design. There is no cost, consumption or space inconvenience for all the boards are alternately powered by a single source already installed in the machine. Furthermore, the user will not be troubled when selecting a non-existent game for because the machine promptly cancels the game, which will no longer appear on screen.

The above results in a number of advantages and namely that the name of the games available can be changed; only one power source is used; a faulty game board can be removed to be repaired without altering normal operation in games selection; each board installed can be played as the owner of the machine shall choose, by credit or by time; information is provided in Spanish from the TV monitor to the player in order to select the game he wishes to play, and also to the owner for the obtaining of game statistics, color and sound adjustments, price per game, and so forth; and the possibility of the player changing games, even once the game has begun.

DESCRIPTION OF THE DRAWINGS

In order to provide a fuller description and contribute to the complete understanding of the characteristics of this invention, a sheet of drawings is attached to the specification with a single figure showing a block diagram of the switching and control system with four video game boards subject hereof.

DESCRIPTION OF THE PREFERRED EMBODIMENT OF THE INVENTION

The figure shows the system made; up of a C.P.U. (1), input/output circuits (2) and a system RGB generator (3).

The input/output circuits (2) communicate the C.P.U. (1) with a display (4), money boxes (5), coin meters (6) and control panel (7), i.e., with the system's input/output units.

This group of input/output circuits (2) also includes the conventional switches (8) for the various beards (9), the function thereof being to switch the power supplied by the power source (10), the audio signal for the loudspeaker (11) and to switch the color and synchronism signal for the monitor (12), switching being selected for each of the boards. A group of switches (8a) are interconnected between power source (10) and inputs of the video game boards (9) whereas a group of switches (8b) are connected between the boards (9) and monitor screen (12), loudspeaker (11) and input/output circuits (2).

When the machine is turned on, the system starts to reset the circuitry, and promptly executes the program to verify correct operation of the circuitry, essential to the C.P.U. (1) which will then give way to the exhibition program section.

While exhibition is ongoing, the C.P.U. (1) continually checks the input circuits to verify the presence of impulses in the money box(es) (5) input circuit. When the presence of such impulses is detected, the relevant information will be conveyed to the screen (12) and display (4) respectively using the output and RGB (3) circuits.

When a game is selected, whether by the program when in an exhibition mode, or by the user when in a game mode, the C.P.U. (1) conveys the control panel (7) graphics information and a sequence indicating the kind of adjustment in which the selected beard (9) is to the RGB (3) circuits.

When game beard (9) initialisation is over, the C.P.U. (1) orders the output circuits to switch the system RGB signal for the selected game beard (9), likewise connecting this board's sound output system to the loudspeaker (11).

Then and until the game is over, whether by games or by time, the screen (12) will be taken up by the graphics provided by the game beard (9).

The system only controls the display (4) to view the number of credits remaining and/or game time. Control of the screen (12) will only begin again if the player decides to quit the game, by means of the two start buttons, or when the game or the game time or player credit is over.

It is believed that the device has now been sufficiently described for any person skilled in the art of the invention to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

I claim:

1. A switching and control system for a plurality of video game boards for video game machines, comprising a CPU including a microprocessor and a circuitry for the program hardware; input/output circuits communicating with the CPU; a single power source; a system RGB generator connected to and receiving signals from the CPU; at least one loudspeaker; at least one monitor screen; a first group of switches connected in common to said power source and also connected to said input/output circuits and to said video game boards and being operated for switching a selected video game board to said source power; and a second group of switches connected to said video game boards, said input/output circuits, said RGB generator, said loudspeaker and said monitor screen and being operated for switching an audio signal and a color and synchronism signal to said loudspeaker and said monitor screen, respectively, for said selected video game board which is selected in accordance with a set program in the CPU and orders received from the user, said RGB generator being connected to said monitor screen through said second group of switches and to the CPU to provide that information sent by the CPU is viewed on said monitor screen as moves are made on said video game boards and under program control.

2. The switching and control board according to claim 1, and further comprising at least one display connected to said input/output circuits for viewing information sent by the CPU, regarding credits or time.

3. The switching and control system according to claim 1, and further comprising at least one money box, at least one coin meter and control panel buttons, all connected to said input/output circuits which allow the CPU to receive user's instructions received via said money box, coin meter and control panel buttons.

* * * * *